Dec. 18, 1951            R. L. MERCER            2,579,120
VALVE CAP GAUGE
Filed April 12, 1949
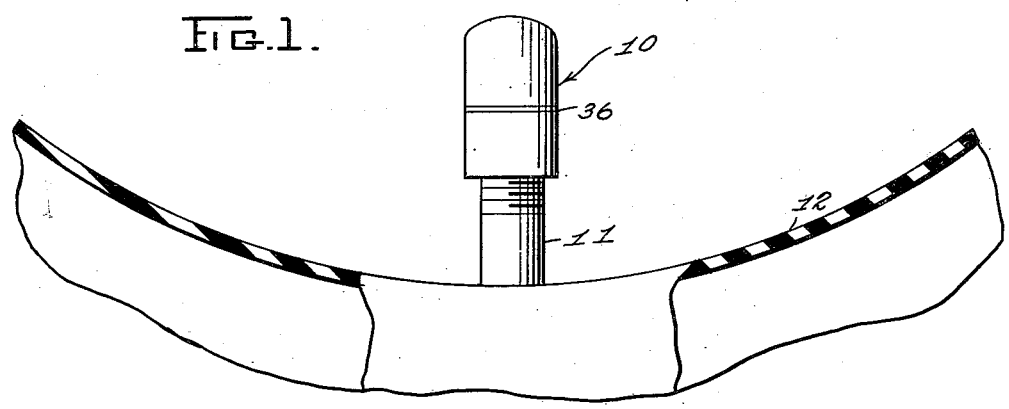
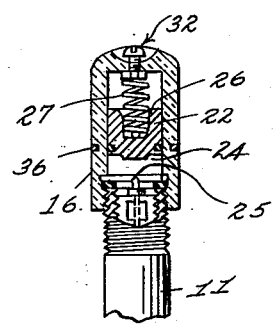
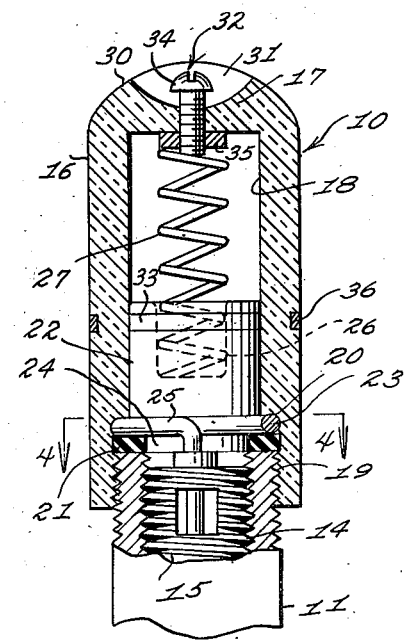
INVENTOR.
RAYMOND L. MERCER
BY
McMorrow, Berman & Davidson
ATTORNEYS Patented Dec. 18, 1951

2,579,120

UNITED STATES PATENT OFFICE 2,579,120

VALVE CAP GAUGE

Raymond L. Mercer, Morenci, Mich.

Application April 12, 1949, Serial No. 86,934

3 Claims. (Cl. 116—34)

This invention relates to air pressure gauges, and more particularly to a tire pressure gauge for attachment to the valve stem of the tire.

It is an object of this invention to provide a valve cap gauge which will be engaged on the threaded end of the valve stem of a tire in the manner of a valve cap, to be supported thereon during the use of the tire for indicating that the air pressure in the tire is up to a selected value.

Another object of this invention is to provide a valve cap gauge which may be made in various sizes for application to the various sized tires in general commercial use.

Another object of this invention is to provide a valve cap gauge of the kind to be more particularly described hereinafter, which is transparent so that the condition of the gauge and the tire pressure indicated thereby may be readily viewed at all times by persons interested in the condition of the tire.

Still another object of this invention is to provide a light-weight valve cap gauge of this kind which is light in weight, strong in construction and formed of a minimum number of parts, whereby the device may be manufactured and sold at a low price.

A further object of this invention is to provide a valve cap gauge of this kind which normally holds the valve in a balanced condition between open and closed, and the arrangement of the valve cap is such that upon damage or breaking of the cap, the valve will be free for movement to the closed position as affected by the pressure in the tire.

With the above and other objects in view, my invention consists in the arrangement, combination and details of construction disclosed in the drawings and specification, and then more particularly pointed out in the appended claims.

In the drawings:

Figure 1 is a side elevation of a valve cap gauge constructed according to an embodiment of my invention, applied to the valve stem of a tire or tube, the tire or tube being shown partly broken away and partly in section;

Figure 2 is a transverse section of the valve cap gauge applied to the valve stem, the gauge being shown in the fully balanced condition with the valve closed;

Figure 3 is an enlarged transverse section showing the piston in the lowered position holding the valve open;

Figure 4 is a horizontal section taken on the line 4—4 of Figure 3.

Referring to the drawings, the numeral 10 designates generally a valve cap gauge for indicating the air pressure in a tire or tube, the gauge also forming a valve cap for the stem of the tire. The valve cap gauge is adapted to be threadably engaged on the upper threaded end of the valve stem 11, normally provided in the formation and structure of a tube or tire 12.

The valve 14 in the valve stem 11 is of the conventional structure having a valve core 15 spring-pressed upwardly to the valve-closing position, and the upper end of the valve core 15 normally extending upwardly in the valve stem 11 to a position substantially flush with the upper end of the open end of the valve stem.

The valve cap gauge 10 is formed of a transparent body 16 which is preferably formed of plastic or other suitable transparent material. The body 16 is cylindrical in configuration, open at the bottom end and having a top wall 17. The body 16 is formed with a longitudinal bore 18 opening from the lower end thereof. The lower end of the body 16 is formed with a threaded recess 19 having a diameter slightly greater than the diameter of the bore 18 to provide a shoulder 20 at the lower end of the reduced-diameter bore 18 and the upper end of the recess 19. A looped spring 23 is engaged in the recess 19, engaging the shoulder 20, and is formed with an inwardly-extending arm 25 downturned at the axial center of the recess 19 for engaging the upper end of the valve core. The body 16 is adapted to be threaded onto the upper threaded end of the stem 11 until the extreme upper end of the stem 11 abuts the shoulder 20. In order to provide for a secure seal between the cap 16 and the stem 11, I have provided a washer 21 made of rubber or other suitable compressible material, which will be seated on the shoulder 20 and engage the upper end of stem 11 in the threaded engagement of the body 16 on the stem.

A plug or piston 22 is slidable in the bore 18 and formed with a reduced-diameter lower end 24 having a diameter substantially equal to the inside diameter of the central opening through the washer 21.

A central recess 26 is formed on the upper surface of the piston 22, coaxial therewith, for receiving the lower end of a coiled spring 27.

The upper end of the body 16 is convex in configuration, as noted clearly by the numeral 30 in Figure 3 of the drawings. A concave recess 31 is formed in the extreme upper end of the body 16, and a screw 32 is rotatably supported in the upper wall 17, the head 34 of the screw being seated in the recess 31. A nut 35 is fixed on the upper end of the spring 27 and threadably engaged with the bolt or screw 32. The bolt 32 provides for the adjustment of the spring tension of the spring 27 for selectively varying and controlling the spring tension which presses the piston 22 downwardly in the body 16 for engagement with the valve core 15.

In the use and operation of the valve cap gauge 10, the body 16 is threadably engaged on the threaded upper end of the valve stem 11. With pressure in the tire or tube 12, the valve core 15 is normally pressed to the raised position, as shown in Figure 2 of the drawings. As the cap 10 is completely engaged with the stem 11, the arm 25 will engage the upper end of the core 15. The tension of the spring 27 has been adjusted to hold the piston 22 downward in the body 16 against the air pressure until the air pressure in the tire exerts a selected force upwardly on the piston 22 substantially equal to the spring tension forcing the piston 22 downwardly.

When the air pressure in the tire 12 is equal to or slightly greater than the spring tension of the spring 27, the air pressure will force the piston 22 upwardly against the tension of the spring and the plug or piston 22 will be moved upwardly from its seated position on the inward extension of the gasket 21.

An index mark 36, which may be formed as an inset ring about the body 16, is adapted to be aligned with a peripheral rubber washer 33 on the piston 22 in its raised position for indicating that the air pressure in the tire is equal to the selected and adjusted spring tension. The friction engagement of the rubber washer 33 with the inside wall of the body 16 will hold the piston 22 against loose sliding movement. When the air pressure is below that desired, the index 36 will be disposed above the piston 22, and when the air pressure is up to the desired value, the piston 22, being raised off of the seat or washer 21, will be disposed in such a manner that the upper end of the piston will be above the index mark.

In the use of a tire having a valve cap gauge of this kind, if the valve cap gauge should become damaged, the arm 25 would be moved out of engagement with the core 15 so that the air pressure will bias the core 15 to the valve-closing position.

I do not mean to confine myself to the exact details of construction herein disclosed, but claim all variations falling within the purview of the appended claims.

I claim:

1. An air-pressure indicating device for attachment to the valve stem of a tire comprising a transparent cylindrical body having a longitudinal bore opening at the lower end thereof, the lower open end being threaded internally for attachment to said valve stem, an internal shoulder formed at the lower end of said bore abutting the upper end of said valve stem, an annular gasket seated on said shoulder and extending inwardly thereof, an annular member engaged between said gasket and said shoulder, a radial extension on said annular member having a depending end engageable with the valve core in the stem for depressing the valve and holding the valve open, a piston slidable in said bore and normally seated on the inward extension of said gasket, a spring in said body urging said piston downwardly to said seated position against the air pressure in said tire acting on the lower face of said piston upwardly, an index on the exterior of said body registrable with said piston in the raised position for indicating that the air pressure in the tire is equal to the spring tension, and an anchoring screw for said spring for selectively varying the spring tension.

2. Means for physically indicating the air pressure in a pneumatic tire comprising a transparent cylindrical sleeve having a closed end and an open internally threaded end, said threaded end being threadingly engageable on the valve stem of the tire, an internal shoulder formed on said sleeve for limiting the threaded movement of the sleeve on the stem, a gasket interposed between the end of the valve stem and the shoulder, a member clampingly engaged between the gasket and the shoulder, a radial extension on said member terminating in a depending end, said end being axially aligned with and engaging the valve in the valve stem for depressing the valve and holding it unseated, a piston working in said sleeve and having its lower face normally flush with the shoulder, an indicating marking formed on the exterior of the sleeve and registering in coincidence with the piston the selected air pressure of the tire, a spring bearing on the upper face of the piston for retaining the piston in its normal position against the pressure of the air acting on its lower face, an anchoring and adjusting screw disposed through the closed end of the sleeve, and a mounting member for the spring carried by the inner end of the screw.

3. Means for physically indicating the air pressure in a pneumatic tire comprising a transparent cylindrical sleeve having a closed end and an open internally threaded end, said threaded end being threadingly engageable on the valve stem of the tire, an internal shoulder formed on said sleeve for limiting the threaded movement of the sleeve on the stem, a gasket interposed between the end of the valve stem and the shoulder, a member clampingly engaged between the gasket and the shoulder, a radial extension on said member terminating in a depending end, said end being axially aligned with and engaging the valve in the valve stem for depressing the valve and holding it unseated, a piston working in said sleeve and having its lower face normally flush with the shoulder, an indicating marking formed on the exterior of the sleeve and registering in coincidence with the piston the selected air pressure of the tire, a spring bearing on the upper face of the piston for retaining the piston in its normal position against the pressure of the air acting on its lower face, an anchoring and adjusting screw disposed through the closed end of the sleeve, a mounting member for the spring carried by the inner end of the screw, and a concave exterior recess in said closed end receiving the outer end of the screw.

RAYMOND L. MERCER.

REFERENCES CITED

The following references are of record in the file of this patent:

UNITED STATES PATENTS

| Number | Name | Date |
|---|---|---|
| 1,276,089 | Loomis et al. | Aug. 20, 1918 |
| 2,225,674 | West | Dec. 24, 1940 |
| 2,225,675 | West | Dec. 24, 1940 |